3,317,482
PRODUCTION OF POLYLAUROLACTAM

Joachim Kunde, Frankenthal, Pfalz, and Hans Wilhelm, Horst Metzger, and Helmut Doerfel, Ludwigshafen (Rhine), Germany, assignors to Badische Anilin- & Soda-Fabrik Aktiengesellschaft, Ludwigshafen (Rhine), Germany
No Drawing. Filed Oct. 22, 1964, Ser. No. 405,849
Claims priority, application Germany, Oct. 26, 1963, B 74,026; Sept. 30, 1964, B 78,731
2 Claims. (Cl. 260—78)

This invention relates to a two-stage process for the production of polylaurolactam in which laurolactam is prepolymerized in the first stage in the presence of water at 200° to 340° C. at the autogenous pressure, the water is removed, and polymerization is continued in the second stage at 270° to 340° C.

It is known that laurolactam which is much more difficult to polymerize than caprolactam can be polymerized at above 300° C. in the presence of aliphatic monocarboxylic or dicarboxylic acids having more than five carbon atoms. In order to have sufficient effect, the monocarboxylic or dicarboxylic acids have to be used in amounts in which they appreciably affect the chain length. It is therefore difficult to prepare polylaurolactam having a particularly high molecular weight.

It is an object of this invention to prepare high molecular weight polylaurolactam.

Another object of the invention is to prepare polylaurolactam having only a small content of monomer.

Yet another object of the invention is to carry out the polymerization without the large amounts of catalyst hitherto necessary.

Other objects will be apparent from the following detailed description.

These objects are achieved by starting the polymerization of laurolactam in the first stage in the presence of water at 200° to 340° C. at the autogenous pressure, substantially removing the water and continuing the polymerization in the second stage at 270° to 340° C.

Polyamides prepared in this way have high molecular weights and monomer contents of less than 2% by weight. It is also an advantage over prior art methods that additions of monocarboxylic or dicarboxylic acids in the large amounts required for adequate polymerization are not necessary and consequently the molecular weight of the polylaurolactam is not so seriously affected. Other advantages will be apparent from the description.

In accordance with the invention, the polymerization may be carried out either at the lower temperatures, within the range indicated, for long periods or at the higher temperatures for short periods.

In carrying out the process according to the invention at the lower temperatures it is advantageous to heat a mixture of laurolactam and 10 to 300 mole percent, preferably 30 to 200 mole percent, of water (with reference to the weight of laurolactam) in conventional autoclaves for two to ten hours, advantageously six to eight hours. The polymerization temperatures may be between 200° and 320° C. This prepolymerization is advantageously carried out at from 230° to 290° C. An autogenous pressure of up to 73 atmospheres gauge may thus be set up. This autogenous pressure is mainly dependent on the polymerization temperature, the amount of water used and the ratio of the volume of the gas space in the autoclave to the volume of the mixture of laurolactam and water. Operation is particularly economical if the prepolymerization is carried out at pressures of from 10 to 30 atmospheres gauge. Following the prepolymerization under superatomospheric pressure, the water is practically completely removed from the reaction mixture by releasing the gas from pressure while supplying heat to the reactor. The polylaurolactam is then heated at 270° to 340° C., advantageously at 280° to 310° C., at atmospheric pressure for ten to twenty-five hours in conventional apparatus. The period of the afterpolymerization determines the viscosity and the residual monomer content of the polylaurolactam.

Polycondensation in both stages is advantageously carried out under a protective gas such as nitrogen.

Polylaurolactam prepared according to this invention, owing to its low water imbibition, its good dieletric properties and its very good dimensional stability, is particularly suitable for the production of injection moldings or extruded material, such as rods and sections, as semifinished products, and also gears, pipe, film, sheeting, coatings by the fluidized bed method, bristles and fibers.

The polymerization may also be carried out in shorter periods and at higher temperatures. For this purpose, the polylaurolactam may be heated for 1 to 6 hours at 300° to 340° C. at the autogenous pressure in the presence of from 10 to 75 mole percent of water and, after removal of the water, for 0.2 to 5 hours under nitrogen and at atmospheric pressure at 270° to 340° C. It is especially advantageous to carry out the polymerization by heating laurolactam for 2 to 5 hours at 305° to 330° C. in the presence of 20 to 60 mol percent of water and after removing the water, for 1 to 4 hours at 280° to 330° C. It is preferably in both stages to polymerize in an atmosphere of inert gas, for example nitrogen, and to carry out the polymerization after removal of the water under normal pressure. In this way it is possible to carry out the polymerization economically and in a short time. Moreover, it is possible to produce laurolactam having a narrow molecular weight distribution.

In a particularly advantageous embodiment of the process the starting materials used, particularly laurolactam, are carefully freed from oxygen, for example by passing nitrogen over the crystalline laurolactam in a closed storage vessel and then transferring the laurolactam into a melting vessel which has been heated to 180° to 200° C. and which is filled with nitrogen. The oxygen may be removed by evacuating the vessel and equalizing the pressure by introducing an inert gas. The molten laurolactam is heated at the autogenous pressure for 2 to 5 hours at 305° to 330° C. with the exclusion of oxygen in an autoclave in the pressence of 20 to 60 mole percent of water and, if desired, conventional additives, such as acidic or basic chain stoppers, e.g., acetic acid, propionic acid, stearic acid, benzoic acid or dodecylamine, and fillers, fibers, pigments or dyes. The amount of water is preferably chosen so that a gauge pressure of 15 to 26 atmospheres is set up during prepolymerization. During prepolymerization, more than 98% of the amount of laurolactam is usually converted into low molecular weight polylaurolactam, the extractable portion of laurolactam being less than 2% by weight. After prepolymerization, the water vapor is removed by gradually releasing the reaction mixture from pressure. The polymerization mixture is then heated to 280° to 330° C. under nitrogen at atmospheric pressure, the molecular weight of the polymer thus being increased and the residual water substantially removed. The polymerization times in the second stage can be shortened or increased by using subatmospheric or slightly increased pressure. As soon as the desired molecular weight has been reached (polyamides having good processability usually have a K-value between 40 and 60 measured in 96% sulfuric acid according to Fikentscher, Cellulosechemie, 12, 58 (1932)), the polymer is advantageously forced out in the form of strands with nitrogen through nozzles arranged at the bottom of the autoclave, cooled in water, granulated and then dried under nitrogen. The polylaurolactam is practically colorless. The extractable fraction is less than 1.2% by weight.

To regulate the chain length, monocarboxylic acids having less than five carbon atoms, such as acetic acid, propionic acid or butyric acid, alone or mixed together, may be added to the laurolactam before or during the polymerization in amounts of 0.05 to 2 mole percent, preferably 0.1 to 0.5 mole percent. Such an addition adapts the molecular weight and consequently the processing properties of the polylaurolactam to the intended use.

The invention is further illustrated by the following examples. Parts and percentages specified in the examples are by weight. The K-values are measured according to Fikentscher, Cellulosechemie, 12, 58 (1932) (1 g. polylaurolactam dissolved in 100 ml. 96% sulfuric acid).

Example 1

A mixture of 100 parts of laurolactam, 18 parts of water and 0.1 part of propionic acid is heated in a closed reactor under nitrogen for eight hours at about 235° C. An autogenous pressure of about 28 atmospheres gauge is thereby set up (the volumetric ratio of the mixture of lactam melt and water to the volume of the gas space in the reactor is 1:2). The pressure is then slowly released and the temperature in the interior of the reactor raised to about 290° C., the water thereby being removed practically completely. Nitrogen is then passed over the polymer and polymerization is continued at atmospheric pressure and at about 290° C. for nineteen hours. Granulate prepared by conventional methods from the polylaurolactam melt obtained has a K-value of 54.7 (measured in a solution of 1 g. in 100 ml. of concentrated sulfuric acid). The fraction which can be extracted from the granulate with methanol is 1.96% by weight. The polylaurolactam is suitable for the production of moldings, such as film, sheeting or gears.

Example 2

A mixture of 100 parts of laurolactam, 6.25 parts of water and 0.4 part of propionic acid is heated in a closed reactor under nitrogen for eight hours at about 235° C. An autogenous pressure of about 18 atmospheres gauge is thus set up (the ratio of the volume of mixture of lactam melt and water to the volume of the gas space in the reactor is 1:2). The pressure is then slowly released and the temperature in the interior of the reactor raised to about 290° C. so that the water is removed practically completely. Nitrogen is then passed over the polymer and polymerization is continued at atmospheric pressure and at about 290° C. for twenty-five hours. Granulate prepared by conventional methods from the polylaurolactam melt has a K-value of 50.5 (measured in a solution of 1 g. in 100 ml. of concentrated sulfuric acid). The fraction which can be extracted from the granulate with methanol is 0.85% by weight. The melt of this polylaurolactam flows easily. The polyamide is therefore particularly suitable for the production of sintering powder for surface coating or for spinning purposes.

Example 3

20 parts of crystalline laurolactam is placed under nitrogen in an autoclave that has been heated to 180° C. and rinsed with nitrogen. Nitrogen at 5 atmospheres gauge is pumped in twice and the autoclave then vented. The autoclave is closed again and a mixture of 0.05 part of propionic acid and 0.91 part of water pumped in. The mixture is heated to 315° C., so that a gauge pressure of 24 atmospheres is set up, and the said temperature maintained for 3 hours. The pressure is released within an hour, the bulk of the water being distilled off. The polylaurolactam formed is heated for two hours at 315° to 330° C. at atmospheric pressure in a current of nitrogen and then forced out in the form of a strand with nitrogen through a nozzle at the bottom of the autoclave, solidified by cooling with water and then granulated. After drying, 19.2 parts of colorless polylaurolactam is obtained having an extractable fraction of 1% and a K-value of 50. The product is particularly suitable for processing by injection molding and for fluidized bed coating.

If the polylaurolactam be forced out after the flashing of the water vapor without afterpolymerization, a product having the K-value 44 and an extractable fraction of 1.3% is obtained. The properties of the polylaurolactam after different aftercondensation times may be seen from Table I.

TABLE I

| Period of aftercondensation at 315°–330° C. (hours) | K-value (1% in $H_2SO_4$) | Extractable fraction (percent) |
|---|---|---|
| 1 | 48 | 1.2 |
| 2 | 50 | 1 |
| 3 | 51 | 1 |
| 4 | 51 | 1 |
| 6 | 51 | 1 |

Example 4

The procedure of Example 3 is followed, but prepolymerization is carried out for 5 hours at 320° C. and afterpolymerization is effected at the same temperature. The properties of the polylaurolactam obtained after different aftercondensation times are as follows:

TABLE II

| Period of aftercondensation at 320° C. (hours) | K-value (1% in $H_2SO_4$) | Extractable fraction (percent) |
|---|---|---|
| 0 | 41 | 1.3 |
| 1 | 47.3 | 1 |
| 2 | 49 | 0.8 |
| 3 | 49.5 | 1 |
| 4 | 51 | 1 |

A sample of polylaurolactam discharged at 5 atmospheres gauge steam pressure has an extractable fraction of 1.6%.

Example 5

20 parts of laurolactam is freed from oxygen as described in Example 3, melted, and heated to 310° C. under nitrogen in an autoclave in the presence of 0.91 part of water and 0.1 part of stearic acid. The temperature of 310° C. is maintained for 5 hours. The polymerization mixture is then released from pressure and cooled to 290° C. Afterpolymerization is carried out at 290° C. in a current of nitrogen. The polylaurolactam obtained after different polymerization times has the following properties:

TABLE III

| Period of aftercondensation (hours) | K-value (1% in $H_2SO_4$) | Extractable fraction (percent) |
|---|---|---|
| 0 | 44 | 0.6 |
| 1 | 51 | 0.8 |
| 2 | 51.6 | 0.9 |
| 3 | 52.2 | 0.8 |
| 4 |  | 1 |
| 5 | 53.2 |  |

We claim:
1. A process for the manufacture of polylaurolactam by polycondensation of laurolactam at elevated temperatures which comprises heating a mixture of laurolactam and 20–60 mol percent of water for 1–6 hours, at 305–330° C. at autogenous pressure to produce low molecular weight polylaurolactam, then slowly releasing the pressure to atmospheric pressure while heating the polylaurolactam and removing the water of said mixture during the release of pressure, and then heating the resultant product for 0.2 to 5 hours under nitrogen at 280–330° C. to produce polylaurolactam having a K-value, as measured as 1 gram of polylaurolactam dissolved in 100 ml. of 96% sulfuric acid according to Fikentscher, Cellulosechemie, 12, 58 (1932), in the range of 40 to 60 and a methanol-extractable fraction of less than 1.2% by weight.

2. A process as claimed in claim 1 wherein said autogenous pressure is in the range of 15 to 26 atmospheres and the extractable portion of said low molecular weight polylaurolactam is less than 2% by weight.

References Cited by the Examiner

UNITED STATES PATENTS

| | | | |
|---|---|---|---|
| 2,241,322 | 5/1941 | Hanford | 260—782 |
| 3,060,173 | 10/1962 | von Schickh | 260—78 |

OTHER REFERENCES

Ser. No. 309,376, Friederich et al. (A.P.C.), published Apr. 20, 1943, now abandoned.

Ser. No. 370,142, Schlack (AP.C.), published June 22, 1943, now abandoned.

WILLIAM H. SHORT, *Primary Examiner.*

LOUISE P. QUAST, *Examiner.*

H. D. ANDERSON, *Assistant Examiner.*